US011748615B1

(12) United States Patent
Wu et al.

(10) Patent No.: US 11,748,615 B1
(45) Date of Patent: Sep. 5, 2023

(54) HARDWARE-AWARE EFFICIENT NEURAL NETWORK DESIGN SYSTEM HAVING DIFFERENTIABLE NEURAL ARCHITECTURE SEARCH

(71) Applicant: Meta Platforms, Inc., Menlo Park, CA (US)

(72) Inventors: Bichen Wu, Menlo Park, CA (US); Peizhao Zhang, Fremont, CA (US); Peter Vajda, Palo Alto, CA (US); Xiaoliang Dai, Princeton, NJ (US); Yanghan Wang, Sunnyvale, CA (US); Yuandong Tian, San Carlos, CA (US)

(73) Assignee: META PLATFORMS, INC., Menlo Park, CA (US)

( * ) Notice: Subject to any disclaimer, the term of this patent is extended or adjusted under 35 U.S.C. 154(b) by 943 days.

(21) Appl. No.: 16/704,971

(22) Filed: Dec. 5, 2019

Related U.S. Application Data

(60) Provisional application No. 62/776,310, filed on Dec. 6, 2018.

(51) Int. Cl.
*G06N 3/08* (2023.01)
*G06N 3/082* (2023.01)
*G06N 3/045* (2023.01)
*G06N 3/047* (2023.01)
*G06N 3/084* (2023.01)

(52) U.S. Cl.
CPC ............. *G06N 3/08* (2013.01); *G06N 3/045* (2023.01); *G06N 3/047* (2023.01); *G06N 3/082* (2013.01); *G06N 3/084* (2013.01)

(58) Field of Classification Search
CPC ........ G06N 3/0454; G06N 3/08; G06N 3/082; G06N 3/084
See application file for complete search history.

(56) References Cited

U.S. PATENT DOCUMENTS

| 2017/0083375 A1* | 3/2017 | Martins ................. G06F 9/5044 |
| 2020/0167191 A1* | 5/2020 | Yeh ....................... G06F 9/4887 |

OTHER PUBLICATIONS

Cai, Han, Ligeng Zhu, and Song Han. "Proxylessnas: Direct neural architecture search on target task and hardware." arXiv preprint arXiv:1812.00332v1 (2018). (Year: 2018).*

(Continued)

*Primary Examiner* — Hal Schnee
(74) *Attorney, Agent, or Firm* — Shumaker & Sieffert, P.A.

(57) ABSTRACT

Computer implemented systems are described that implement a differentiable neural architecture search (DNAS) engine executing on one or more processors. The DNAS engine is configured with a stochastic super net defining a layer-wise search space having a plurality of candidate layers, each of the candidate layers specifying one or more operators for a neural network architecture. Further, the DNAS engine is configured to process training data to train weights for the operators in the stochastic super net based on a loss function representing a latency of the respective operator on a target platform, and to select a set of candidate neural network architectures from the trained stochastic super net. The DNAS engine may, for example, be configured to train the stochastic super net by traversing the layer-wise search space using gradient-based optimization of network architecture distribution.

16 Claims, 6 Drawing Sheets

(56) References Cited

OTHER PUBLICATIONS

Liu et al., "Darts: Differentiable Architecture Search", 2018 ICLR, Jun. 24, 2018, 12 pp.
Veniat et al., "Learning Time/Memory-Efficient Deep Architectures with Budgeted Super Networks", IEEE/CVF Conference on Computer Vision and Pattern Recognition (CVPR), May 31, 2017, 11 pp.
Yang et al., "NetAdapt: Platform-Aware Neural Network Adaptation for Mobile Applications", ECCV 2018, Sep. 28, 2018, 16 pp.
Deng et al., "ImageNet: A Large-Scale Hierarchical Image Database", 2009 IEEE Conference on Computer Vision and Pattern Recognition, Aug. 18, 2009, 8 pp.
Simonyan et al., "Very Deep Convolutional Networks for Large-Scale Image Recognition", 2015 CLR, Dec. 23, 2014, 13 pp.
Sandler et al., "MobileNetV2: Inverted Residuals and Linear Bottlenecks", The IEEE Conference on Computer Vision and Pattern Recognition (CVPR), Jan. 2018, pp. 4510-4520.
Ma et al., "ShuffleNet V2: Practical Guidelines for Efficient CNN Architecture Design", ECCV 2018: Computer Vision, Jul. 30, 2018, 19 pp.
Huang et al., "CondenseNet: An Efficient DenseNet using Learned Group Convolutions", IEEE/CVF Conference on Computer Vision and Pattern Recognition, Nov. 25, 2017, 10 pp.
Tan et al., "MnasNet: Platform-Aware Neural Architecture Search for Mobile", Conference on Computer Vision and Pattern Recognition, Jul. 31, 2018, 9 pp.
Xie et al., "SNAS: Stochastic Neural Architecture Search", ICLR 2019, Jan. 12, 2019, 17 pp.
Gholami et al., "SqueezeNext: Hardware-Aware Neural Network Design", 2018 IEEE/CVF Conference on Computer Vision and Pattern Recognition Workshops, Aug. 27, 2018, 12 pp.
Han et al., "Deep Compression: Compressing Deep Neural Networks With Pruning, Trained Quantization and Huffman Coding", ICLR, Nov. 20, 2015, 13 pp.
He et al., "Deep Residual Learning for Image Recognition", 2016 IEEE Conference on Computer Vision and Pattern Recognition (CVPR), Dec. 12, 2016, pp. 770-778.
He et al., "AMC: AutoML for Model Compression and Acceleration on Mobile Devices", Computer Vision—ECCV 2018, Aug. 19, 2018, 17 pp.
Howard et al., "MobileNets: Efficient Convolutional Neural Networks for Mobile Vision Applications", Google Inc., Apr. 17, 2017, 9 pp.
Iandola et al., "Squeezenet: Alexnet-Level Accuracy With 50X Fewer Parameters and <0.5MB Model Size", ICLR 2017, Nov. 4, 2016, 13 pp.
Jang et al., "Categorical Reparameterization With Gumbel-Softmax", ICLR, Nov. 3, 2016, 13 pp.
Kingma et al., "Adam: Amethod for Stochastic Optimization", ICLR, Dec. 22, 2014, 9 pp.
Liu et al., "Progressive Neural Architecture Search", ECCV, Dec. 2, 2017, 11 pp.
Maddison et al., "The Concrete Distribution: A Continuous Relaxation of Discrete Random Variables", ICLR 2017, Mar. 5, 2017, 20 pp.
Pham et al., "Efficient Neural Architecture Search via Parameter Sharing", Proceedings of the 35th International Conference on Machine Learning, Feb. 12, 2018, 11 pp.
Paszke et al., "Automatic differentiation in PyTorch", 31st Conference on Neural Information Processing Systems (NIPS 2017), Oct. 28, 2017, 4 pp.
Szegedy et al., "Going deeper with convolutions", 2015 IEEE Conference on Computer Vision and Pattern Recognition (CVPR), Oct. 15, 2015, 9 pp.
Wu et al., "SqueezeDet: Unified, Small, Low Power Fully Convolutional Neural Networks for Real-Time Object Detection for Autonomous Driving", CVPR 2017, Nov. 29, 2017, 9 pp.
Wu et al., "Shift: A Zero FLOP, Zero Parameter Alternative to Spatial Convolutions", CVPR 2018, Dec. 3, 2017, 9 pp.
Wu et al., "SqueezeSeg: Convolutional Neural Nets with Recurrent CRF for Real-Time Road-Object Segmentation from 3D LiDAR Point Cloud", 2018 IEEE International Conference on Robotics and Automation (ICRA), Oct. 19, 2017, 7 pp.
Wu et al., "Mixed Precision Quantization of Convnets Via Differentiable Neural Architecture Search", ICLR 2019 Conference, Nov. 30, 2018, 11 pp.
Wu et al., "SqueezeSegV2: Improved Model Structure and Unsupervised Domain Adaptation for Road-Object Segmentation from a LiDAR Point Cloud", 2019 International Conference on Robotics and Automation (ICRA), Sep. 22, 2018, 7 pp.
Yang et al., "Synetgy: Algorithm-hardware Co-design for ConvNet Accelerators on Embedded FPGAs", FPGA '19: Proceedings of the 2019 ACM/SIGDA International Symposium on Field-Programmable Gate Arrays, Nov. 21, 2018, 11 pp.
Yu et al., "Multi-Scale Context Aggregation by Dilated Convolutions", ICLR 2016, Nov. 23, 2015, 9 pp.
Zhang et al., "ShuffleNet: An Extremely Efficient Convolutional Neural Network for Mobile Devices", 2018 IEEE/CVF Conference on Computer Vision and Pattern Recognition, Dec. 7, 2017, 9 pp.
Zoph et al., "Neural Architecture Search With Reinforcement Learning", ICLR 2017, Nov. 5, 2016, 15 pp.
Zoph et al., "Learning Transferable Architectures for Scalable Image Recognition", 2018 IEEE/CVF Conference on Computer Vision and Pattern Recognition (CVPR), Dec. 1, 2017, 14 pp.
Wu et al., "FBNet: Hardware-Aware Efficient ConvNet Design via Differentiable Neural Architecture Search", Conference on Computer Vision and Pattern Recognition (CVPR), May 24, 2019, 10 pp.

* cited by examiner

HARDWARE-AWARE EFFICIENT NEURAL NETWORK DESIGN SYSTEM HAVING DIFFERENTIABLE NEURAL ARCHITECTURE SEARCH

This application claims the benefit of U.S. Provisional Patent Application No. 62/776,310, filed Dec. 6, 2018, the entire contents of which are incorporated herein by reference.

TECHNICAL FIELD

The disclosure relates to machine learning systems, such as neural network computer vision computing systems for classification, object detection and segmentation.

BACKGROUND

Computing systems are often used to process digital images and video. Recently, artificial intelligence and machine learning systems have been used in areas such as image recognition and classification. Convolutional neural networks, which is one form of a neural network, for example, are becoming more widely used in the area of computer vision and other applications.

SUMMARY

In general, this disclosure describes techniques for automated, efficient generation and deployment of neural networks, including convolutional neural networks, based on characteristics of specific, targeted computing devices. In many applications, such as computer vision tasks including classification, object detection, and segmentation, an improved design of the underlying neural network, e.g., convolutional neural network, usually leads to significant accuracy improvement of the system. However, accuracy improvement usually comes at the cost of higher computational complexity, making it more difficult to deploy convolutional neural networks to resource-constrained devices, such as mobile devices, where computing capacity is often limited.

Designing efficient and accurate neural networks is a technically challenging-problem, especially for resource-constrained devices like mobile devices. For example, the overall design space for potential convolutional neural networks is usually combinatorial. Moreover, the cost of training a given neural network device on a target dataset, in terms of time and complexity, is prohibitive so as to prevent exploration of the neural architecture search (NAS) space. Further, the optimality of convolutional neural networks is often conditioned upon many factors, such as input resolution and target hardware devices. The techniques described herein provide technical solutions to these technical problems.

In one example, a computer-implemented system includes a differentiable neural architecture search (DNAS) engine executing on one or more processors. The DNAS engine is configured with a stochastic super net defining a layer-wise search space having a plurality of candidate layers, each of the candidate layers specifying one or more operators for a neural network architecture. Further, the DNAS engine is configured to process training data to train weights for the operators in the stochastic super net based on a loss function representing a latency of the respective operator on a target platform, and to select a set of candidate neural network architectures from the trained stochastic super net. The DNAS engine may, for example, be configured to train the stochastic super net by traversing the layer-wise search space using gradient-based optimization of network architecture distribution.

In another example, a method includes constructing a stochastic super net defining a layer-wise search space having a number of candidate layers, each of the candidate layers specifying one or more operators for a neural network architecture. The method further includes training the stochastic super net by processing training data to train weights for the operators in the stochastic super net based on a loss function associated with a latency of the respective operator on a target platform; and selecting a set of candidate neural network architectures from the trained stochastic super net.

In another example, a computer-readable medium comprises instructions for causing one or more programmable processors to construct a stochastic super net defining a layer-wise search space having a number of candidate layers, each of the candidate layers specifying one or more operators for a neural network architecture. The computer-readable medium further comprises instructions for causing the processor(s) to train the stochastic super net by processing training data to train weights for the operators in the stochastic super net based on a loss function associated with a latency of the respective operator on a target platform, and select a set of candidate neural network architectures from the trained stochastic super net.

The techniques described herein may be utilized, for example, by a software development framework, toolkit or deployment system for identifying and selecting neural network architectures for target platforms, such as specific types of computers, mobile devices, network edge nodes, application servers and the like. As another example, the techniques may be employed by a controller for identification, construction and deployment, in real-time or pseudo-real time, of particular convolutional neural network architectures for computer vision applications based on, for example, actual resource limitations of the target device(s).

DETAILED DESCRIPTION

This disclosure describes new techniques for efficient convolutional neural networks design. Designing accurate and efficient convolutional neural networks for mobile devices, for example, with constrained computing capacity is challenging. First, as noted above, the design space of potential convolutional neural networks is combinatorially large, and training a convolutional neural network often takes several days. As a result, it is often impossible to explore the design space manually, and recent automated neural architecture search (NAS) approaches are computationally expensive. Second, the optimality of convolutional neural network architectures is conditioned on many factors such as input resolution and target devices. However, the computational cost of manual and automated design makes it infeasible to design different convolutional neural networks for different conditions. Third, previous techniques primarily focus on reducing a convolutional neural network's FLOPs or parameter size, but such hardware independent metrics do not always reflect the actual efficiency on target devices.

To address these technical problems, this disclosure describes various implementations of a differentiable neural architecture search (DNAS) engine that uses, in some examples, gradient-based optimization to search for architectures from a discrete combinatorial space and directly optimizes for actual/expected characteristics for target devices, such as latency per each type of neural network operation and/or power or energy consumption per type of operation.

As such, the techniques described herein provide one or more technical advantages. For example, the techniques described herein avoid enumerating and training individual architectures separately as in previous techniques. Further, convolutional neural network architectures identified by the techniques described herein may surpass the performance of state-of-the-art efficient models designed manually and automatically. Moreover, simulated results indicate the techniques described herein may require less (e.g., hundreds of times less) computational cost compared with previous reinforcement learning-based NAS methods. Such low cost allows the systems described herein to efficiently be applied to target platforms so as to search for convolutional neural network models having different input resolutions, channel size scaling, and target devices, achieving better performances in all these conditions.

Figure 1:
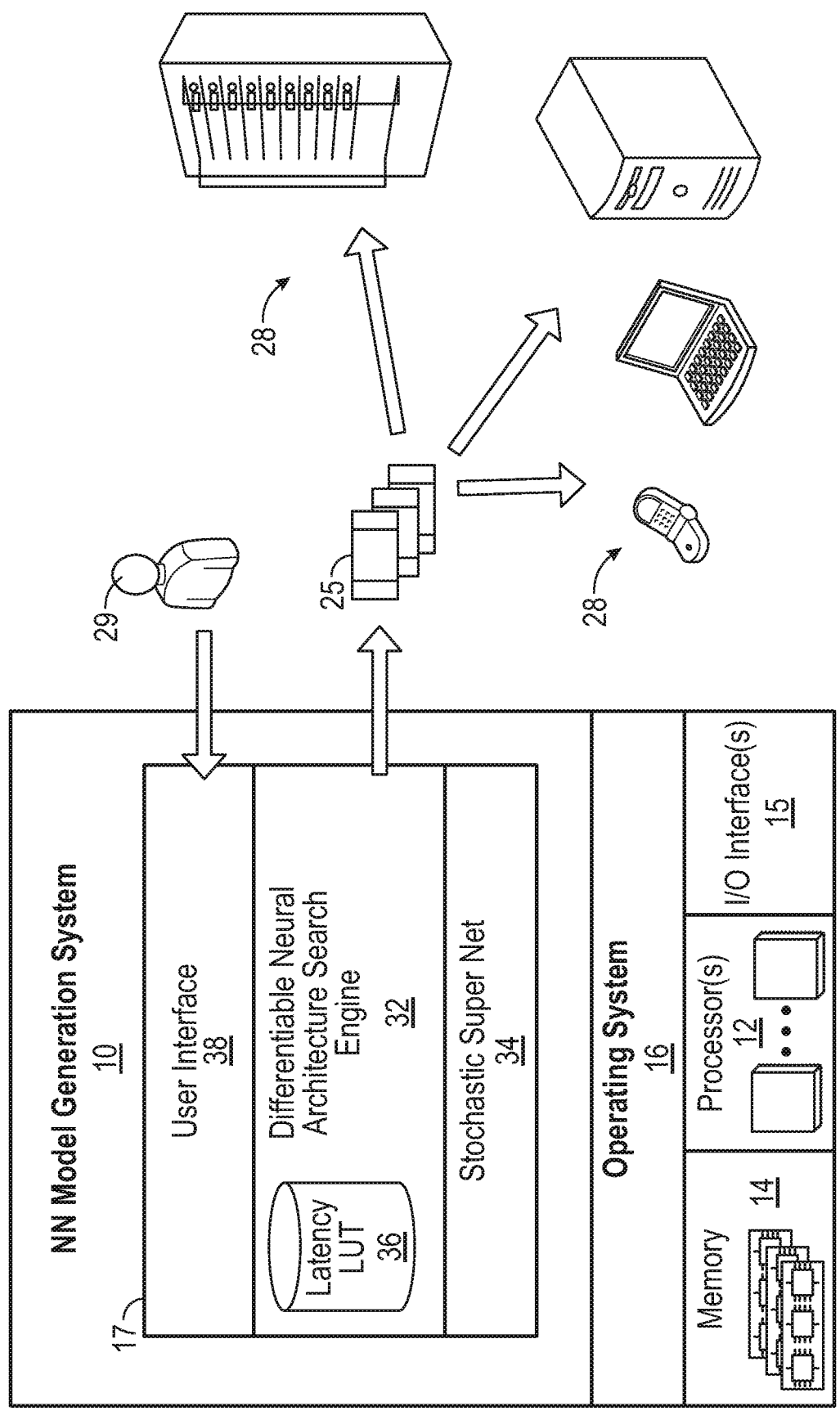
FIG. 1 is block diagram illustrating one example implementation of a neural network model generation system having a differentiable neural architecture search engine for automated model generation in accordance with the techniques described herein.

FIG. 1 is block diagram illustrating one example implementation of a neural network model generation system 10 that enables automated neural network model architecture identification and construction in accordance with the techniques described herein.

As further described herein, neural network model generation system 10 operates to provide a neural network generation tool that, as described herein, provides efficient, automated convolutional neural network design, training and, in some examples, deployment of convolutional neural network models 25 to target devices 28. In general, neural network model generation system 10 includes differentiable neural architecture search (DNAS) engine 32 that searches for potential neural net architectures from a discrete combinatorial space represented as stochastic super net 34. That is, stochastic super net 34 is a special form of a neural network, referred to herein as a super net. In general, super net 34 is a single, large neural net that aggregates a plurality of subnets and integrates their outputs to produce a combined output. Moreover, as described herein, the subnets within super net 34 are particularly arranged so as to define a layer-wise search space represented as a number of searchable candidate layers, each of the layers represented by a subnet of super net 34 and specifying respective input and output dimensions for the corresponding layer and further specifying one or more operators to be performed by the layer for a convolutional neural network architecture.

Moreover, as described herein, DNAS engine 32 generates neural network models 25 by sampling and selecting, e.g., optimizing, potential architectures defined within super net 34 based on characteristics of target devices, such as respective actual or estimated execution latencies for executing neural network operations on target devices 28. DNAS engine 32 may, for example, be configured with one or more latency lookup table (LUT) 36 that store data specifying costs (e.g., computational runtimes) for execution of respective neural network operators on each of target devices 28. User interface 38 provides a mechanism by which user 29 specifies the set of target devices 28 and, for each target device, respective characteristics, such as execution latencies. Each neural net architecture identified within trained stochastic super net 34 can be extracted as an individual, trained neural network model 25 and deployed to the target devices 28 for which the neural network was generated. Neural network models 25 may, for example, take the form of convolutional neural networks deployable to target devices 28.

According to simulation results, architectures for neural network models 25 discovered and generated by DNAS engine 32 surpass performance of state-of-the-art efficient neural network models designed manually. Moreover, neural network models 25 may require significantly less computational cost to generate, identify and train compared with conventional techniques, such as reinforcement learning-based neural network architecture search methods. In one example implementation, the low cost associated with DNAS engine 32 enables searching for different convolutional neural network models optimized for different input resolutions, channel size scaling, and target devices 28.

In this example, neural network model generation system 10 includes one or more processors 12, memory 14 and an operating system 16, that provide a computing platform for executing a development suite having one or more software components 17. Processors 12 are coupled to one or more I/O interfaces 15, which provides one or more I/O interfaces for communicating with external devices, such as a keyboard, display devices, sensors, and the like. Moreover, the one or more I/O interfaces 15 may include one or more wired or wireless network interface controllers (NICs) for communicating with a network. Each of processors 12 may comprise any one or more of a multi-core processor, a controller, a digital signal processor (DSP), an application specific integrated circuit (ASIC), a field-programmable gate array (FPGA), or equivalent discrete or integrated logic circuitry. Memory 14 may comprise any form of memory for storing data and executable software instructions, such as random-access memory (RAM), read only memory (ROM), programmable read only memory (PROM), erasable programmable read only memory (EPROM), electronically erasable programmable read only memory (EEPROM), and flash memory.

Figure 2:
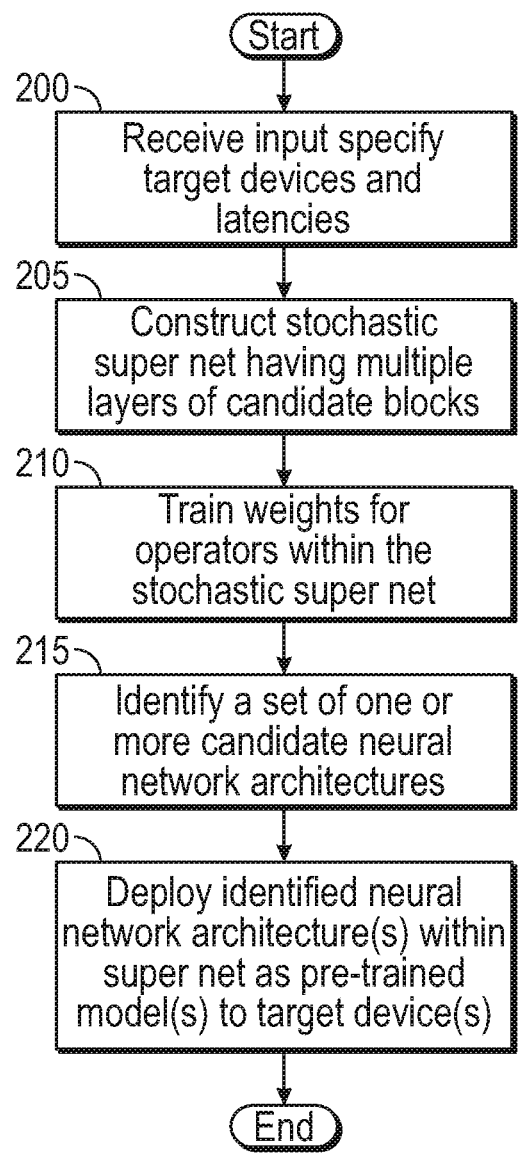
FIG. 2 is a flowchart illustrating an example operation of the neural network model generation system in accordance with the techniques described herein.

FIG. 2 is a flowchart illustrating an example operation of the neural network model generation system 10 in accordance with the techniques described herein. Initially, neural network model generation system 10 receives, via user interface 38, various input parameters, such as data specifying a set of one or more desired target devices 28 for which to generate neural network models 25 (200). User 29 may also, for example, specify for each desired target device 28 data characterizing performance characteristics for each convolutional neural network operation with respect to each device, such as the actual or expected latency of executing each operation on the respective device. Other examples include power or energy consumption per type of operation on each target device 28. User 29 may specify, as one example, an estimated or actual runtime on each of target devices 28 for each of a set of operators for a convolutional neural network architecture. Neural network model generation system 10 stores the data received from user 29, such as by storing the latency data within latency lookup table (LUT) 36.

Next, neural network model generation system 10 constructs (e.g., by generating and/or storing one or more data structures) stochastic super net 34 as a data structure having a plurality of subnets that define a layer-wise search space in which each subnet is represented as a number of searchable candidate layers, each of the layers specifying respective input and output dimensions for the layer and further specifying one or more operators to be performed by the layer for a convolutional neural network architecture (205). Further, neural network generation system 10 may construct each of the layers of stochastic super net 34 to have a respective set of one or more of parallel candidate blocks that may be chosen for the particular layer. In one example, each candidate block contains a point-wise (1×1) convolution, a K-by-K depth-wise convolution where K denotes the kernel size, and another 1×1 convolution. In some examples, each candidate block is able to have a different expansion rate, kernel size, and number of groups for group convolution.

Next, DNAS engine 32 trains stochastic super net 34 by processing training data to train weights for the operators associated with each of the layers in the stochastic super net based on one or more functions characterizing the characteristics of the selected target devices 28, such as a loss function associated with a latency of the respective operator on a particular target device (210). In one example, DNAS engine 32 may, while executing the inference of super net 34, randomly or pseudo randomly sample and execute a single one or a subset of the candidate blocks at each layer of the super net. Further, DNAS engine 32 may, in some examples, train stochastic super net 34 by traversing the layer-wise search space using stochastic gradient descent according to an expected loss function representing the latencies associated with performing the operators on the one or more target devices 28. As such, DNAS engine 32 selects operators with better accuracy and lower latency for the desired target devices 28 and suppresses the opposite ones.

After training super net 34, DNAS engine 32 identifies a set of candidate convolutional neural network architectures (models) from the trained stochastic super net 34, (215). For example, DNAS engine 32 may obtain one or more optimal neural net architectures (models 25) by sampling from the architecture distribution generated during the training process. Each identified neural net architecture can be deployed, such as automatically by neural network model generation system 10 or by user 29 as a trained model 25 specifically to the one of target devices 28 for which the model was generated and trained, i.e., the target device for which the estimated operator latency costs were used (220).

Figure 3:
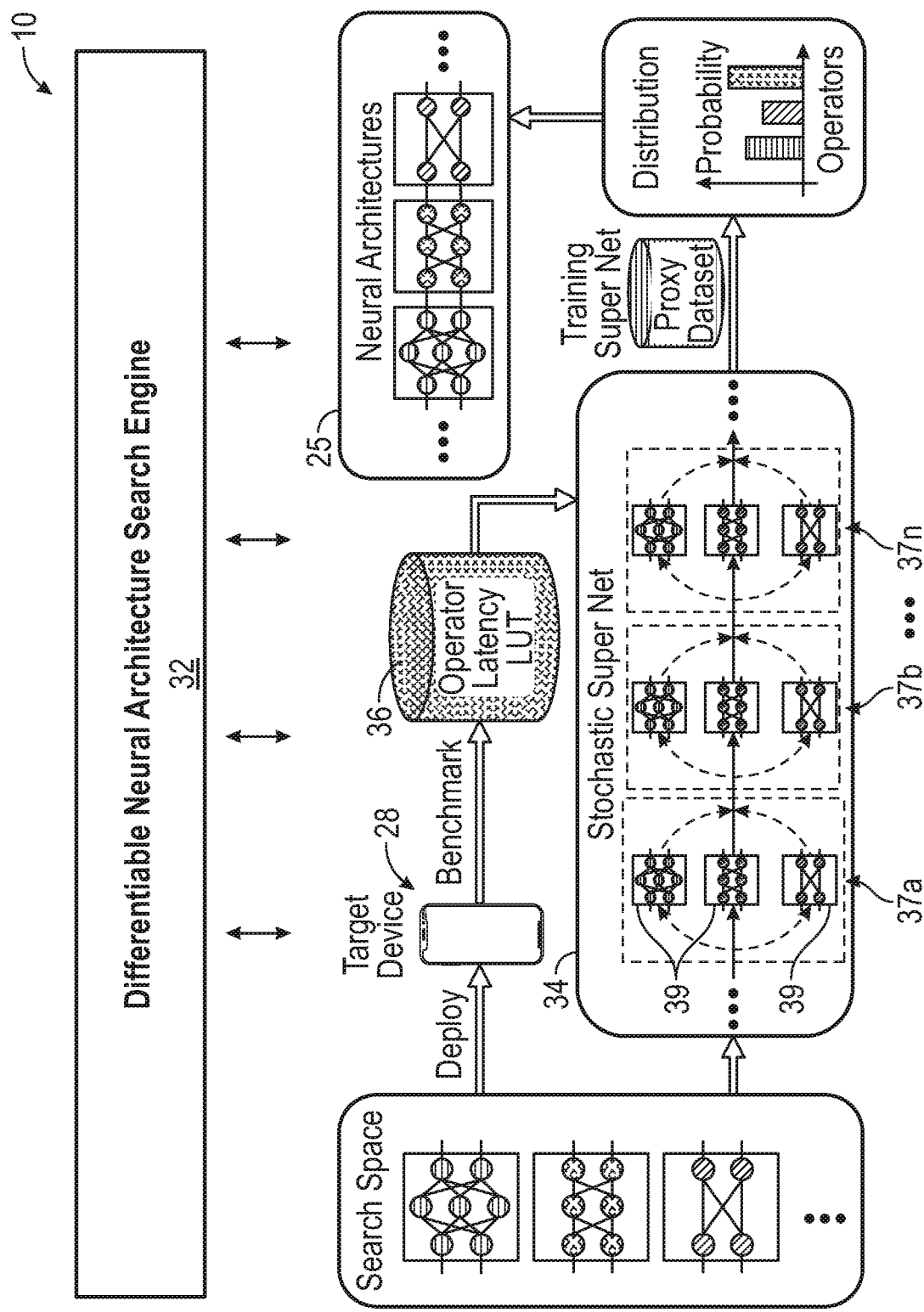
FIG. 3 is a block diagram illustrating in more detail an example NN model generation system 10 that includes a differentiable neural architecture search (DNAS) for convolutional neural network design, where the DNAS is configured to define a layer-wise search space configured such that each layer of a convolutional neural network can choose a different block.

FIG. 3 is a block diagram illustrating in more detail an example NN model generation system 10 that includes a differentiable neural architecture search (DNAS) engine 32 for convolutional neural network design, where the DNAS is configured to define a layer-wise search space configured such that a different one of a plurality operational blocks 39 within each layer 37 can be chosen. That is, FIG. 3 illustrates example operational flow of the algorithms described herein in which differentiable neural architecture search (DNAS) is used to identify and construct hardware-aware efficient neural networks, such as convolutional neural networks.

In general, DNAS engine 32 explores a layer-wise search space defined by stochastic super net 34 configured such that a different operational block can be selected for each layer 37A-37N of the network and, when the selected operational blocks from each layer are assembled in layer-wise fashion, for a complete neural network 25 for deployment to target devices 28. In this way, in one example, the search space is represented by a super net having operators that execute stochastically. As described herein, DNAS engine 32 is configured to find a distribution of operational blocks within the overall search space defined by stochastic super net 34 that yields, in some examples, a convolutional network architecture for the particular target device(s) 28. Moreover, during operation of DNAS engine 32, the architecture of the distribution may be trained during the search process using gradient-based optimization search, such as stochastic gradient descent (SGD), such that the constructed neural net need not be trained after selecting and prior to deployment to target devices 28.

As further explained below, the search process of DNAS engine 32 is extremely fast compared with previous reinforcement learning (RL) based methods. In some examples, the loss used to train stochastic super net 34 consists of both the cross-entropy loss that leads to better accuracy and the latency loss that penalizes the network's latency on a target device. To estimate the latency of an architecture, the latency of each operator in the search space may be measured and provided by user 29 for storage within latency LUT 36 from which DNAS engine 32 computes the overall latency of a candidate convolutional neural network model by summing the latency of each operator. Using this model, the latency of architectures can quickly be estimated by an otherwise enormous search space. Further, the techniques make the latency differentiable with respect to layer-wise block choices, which can be leveraged by DNAS engine 32.

As further described below, simulation results indicate that the techniques described herein surpass the state-of-the-art efficient convolutional neural networks (ConvNets) designed manually or automatically. In general, example simulations indicate that DNAS engine 32 and NN model generation system 10 achieves 74.1% top-1 accuracy with 295M FLOPs and 23.1 ms latency on a Samsung S8 phone, 2.4× smaller and 1.5× faster than MobileNetV2-1.3. Being better than MnasNet, DNAS engine 32 search cost is 216 GPU-hours, 421×lower than the cost for MnasNet. Such low search cost enables ConvNets to be redesigned on a case-by-case basis. For different resolution and channel scaling, the example simulation results indicate that the techniques achieve 1.5% to 6.4% absolute gain in top-1 accuracy compared with MobileNetV2 models. The smallest ConvNet generated by the simulation achieved 50.2% accuracy and 2.9 ms latency (345 frames per second) with a batch size of 1 on Samsung S8. Using DNAS to search for device-specific ConvNet according to the techniques, an iPhone-X-optimized model achieves 1.4× speedup on an iPhone X compared with a Samsung-optimized model.

In general, the techniques use a differentiable neural architecture search (DNAS) to automate and optimize the technical problem of designing neural network architectures for specific target devices 28. The neural architecture search problem can be formulated as:

$$\min_{a \in \mathcal{A}} \min_{w_a} \mathcal{L}(a, w_a). \quad (1)$$

Given an architecture space $\mathcal{A}$, , we seek to find an optimal architecture $a \in \mathcal{A}$ such that after training its weights $\omega_a$, it can achieve the minimal loss $\mathcal{L}(a, w_a)$. In some examples, we focus on three factors of the problem: a) the search space $\mathcal{A}$, , b) the loss function $\mathcal{L}(a, w_a)$ that considers actual or expected latency, and c) an efficient search algorithm.

It is recognized herein that many searched cell structures are very complicated and fragmented and are therefore slow when deployed to mobile CPUs. Moreover, at different layers, the same cell structure can have a different impact on the accuracy and latency of the overall network. In our experiments, allowing different layers to choose different blocks leads to better accuracy and efficiency.

In this disclosure, NN model generation system 10 constructs a layer-wise search space with a fixed macro-architecture, and the system can choose a different block for each layer. An example macro-architecture is described in Table 1 below. The macro architecture may be viewed as configuration data defining the search space of super net 34 for use by NN model generation system 10 when constructing the super net and defines the number of layers and the input/output dimensions of each layer. In this example, the first and the last three layers of the network have fixed operators. For the rest of the layers, their block type needs to be searched. The filter numbers for each layer are hand-picked empirically. Relatively small channel sizes may be used for early layers, since the input resolution at early layers is large, and the computational cost (FLOP count) is quadratic to input size.

That is, Table 1 illustrates an example macro-architecture of the search space for super net 34. In this table, column "Block" denotes the block type for each layer. "TBS" denotes that layers in this stage need to be searched. Column "f" denotes the number of output filters of a block. Column "n" denotes the number of layers in this stage. Column "s" denotes the stride of the first block in a stage.

TABLE 1

| Input shape | Block | f | n | s |
| --- | --- | --- | --- | --- |
| $224^2 \times 3$ | 3x3 conv | 16 | 1 | 2 |
| $112^2 \times 16$ | TBS | 16 | 1 | 1 |
| $112^2 \times 16$ | TBS | 24 | 4 | 2 |
| $56^2 \times 24$ | TBS | 32 | 4 | 2 |
| $28^2 \times 32$ | TBS | 64 | 4 | 2 |
| $14^2 \times 64$ | TBS | 112 | 4 | 1 |
| $14^2 \times 112$ | TBS | 184 | 4 | 2 |
| $7^2 \times 184$ | TBS | 352 | 1 | 1 |
| $7^2 \times 352$ | 1x1 conv | 1504 | 1 | 1 |
| $7^2 \times 1504$ | 7x7 avgpool | — | 1 | 1 |
| 1504 | fc | 1000 | 1 | — |

Figure 4:
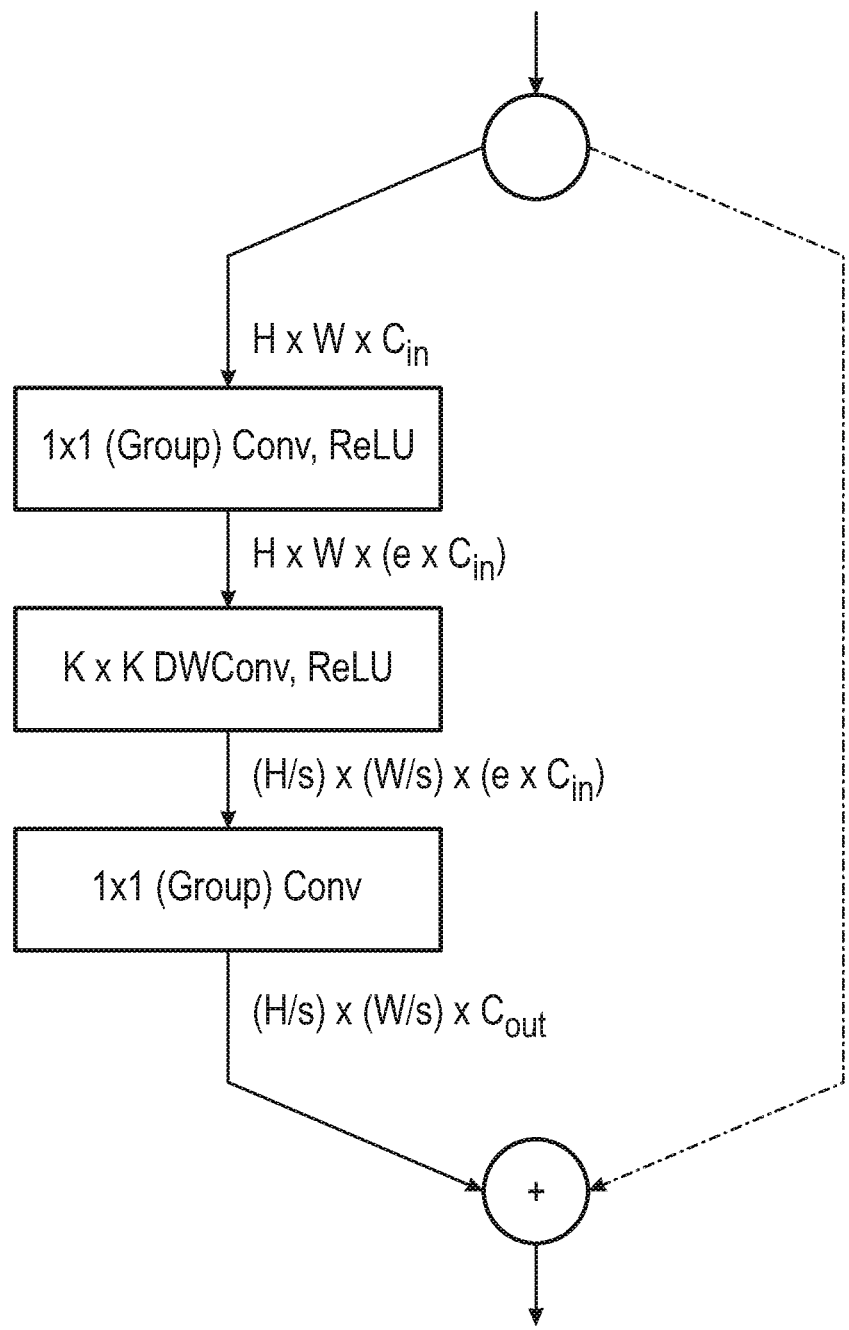
FIG. 4 is an example block structure of the micro-architecture search space where each candidate block in the search space can choose a different expansion rate, kernel size, and number of groups for group convolution.

DNAS search engine 32 can choose a different block at each searchable layer in the network from the layer-wise search space defined by super net 34. One example, block structure is illustrated in FIG. 4, where each candidate block in the search space can choose a different expansion rate, kernel size, and number of groups for group convolution. In this example, each block structure within a given layer contains a point-wise (1×1) convolution, a K-by-K depth-wise convolution where K denotes the kernel size, and another 1×1 convolution. "ReLU" activation functions follow the first 1×1 convolution (1×1 Cony) and the depthwise convolution (K×K DWConv), but there are no activation functions following the last 1×1 convolution (1×1 Cony). If the output dimension stays the same as the input dimension, DNAS engine 32 uses a skip connection to add the input to the output. A hyperparameter, the expansion ratio e, is used to control the block by determining how much to expand the output channel size of the first 1×1 convolution compared with its input channel size. Choosing a kernel size of 3 or 5 is allowed for the depthwise convolution. In addition, group convolution can also be elected by DNAS engine 32 for the first and the last 1×1 convolution to reduce the computation complexity. When group convolution is used, a channel shuffle operation can be added to mix the information between channel groups.

In some experiments, the layer-wise search space contains 9 candidate blocks, with their configurations listed in Table 2 below. Note the inclusion of a block called "skip", which directly feeds the input feature map to the output without actual computations. This candidate block essentially allows reductions in the depth of the network.

TABLE 2

| Configurations of candidate blocks in the search space | | | |
| --- | --- | --- | --- |
| Block type | expansion | Kernel | Group |
| k3_e1 | 1 | 3 | 1 |
| k3_e1_g2 | 1 | 3 | 2 |
| k3_e3 | 3 | 3 | 1 |
| k3_e6 | 6 | 3 | 1 |
| k5_e1 | 1 | 5 | 1 |
| k5_e1_g2 | 1 | 5 | 2 |
| k5_e3 | 3 | 5 | 1 |
| k5_e6 | 6 | 5 | 1 |
| skip | — | — | — |

In summary, the overall search space of super net 34 used during experiments contained 22 layers and each layer is configured to choose from 9 candidate blocks from Table 2. As such, the search space contains $9^{22} \approx 10^{21}$ possible architectures. Finding the optimal layer-wise block assignment from such enormous search space is a non-trivial task.

The loss function used in (1), above, reflects not only the accuracy of a given architecture but also the latency on the target hardware of target devices 28. To achieve this goal, the following loss function is defined:

$$\mathcal{L}(a, w_a) = CE(a, w_a) \cdot \alpha \, \log(LAT(a))^\beta. \quad (2)$$

The first term $CE(\alpha, w_\alpha)$ denotes the cross-entropy loss of architecture a with parameter $w_\alpha$. The second term $LAT(\alpha)$ denotes the latency of the architecture on the target hardware measured in micro-second. The coefficient $\propto$ controls the overall magnitude of the loss function. The exponent coefficient $\beta$ modulates the magnitude of the latency term.

The cross-entropy term can be easily computed. However, the latency term is more difficult, since it requires measurement of the actual runtime of an architecture on a target device. To cover the entire search space, measurement of about $10^{21}$ architectures is needed, which is an impossible task.

To solve this problem, in one example, a latency lookup table model is used to estimate the overall latency of a network based on the runtime of each operator. More formally, it is assumed that:

$$LAT(a) = \sum_l LAT(b_l^{(a)}), \quad (3)$$

where $b_l^{(a)}$ denotes the block at layer-l from architecture a. This assumes that on the target processor, the runtime of each operator is independent of other operators. The assumption is valid for many mobile CPUs and DSPs, where operators are computed sequentially one by one. This way, by benchmarking the latency of a few hundred operators used in the search space, the actual runtime of the $10^{21}$ architectures in the entire search space can be easily estimated. More importantly, as explained herein, using the lookup table model makes the latency term in the loss function (2) differentiable with respect to layer-wise block choices, and this allows use of gradient-based optimization to solve problem (1).

Solving the problem (1) through brute-force enumeration of the search space is very infeasible. The inner problem of optimizing $\omega_\alpha$ involves training a neural network. For ImageNet classification, training a ConvNet typically takes several days or even weeks. The outer problem of optimizing $\alpha \in \mathcal{A}$ has a combinatorially large search space.

To reduce the computational cost, some prior techniques attempt to train candidate architectures on an easier proxy dataset. The learned architectures are then transferred to the target dataset. Despite these improvements, solving problem (1) is still prohibitively expensive—training a network on the proxy dataset is still time-consuming, and thousands of architectures need to be trained before reaching the optimal solution.

The techniques described herein adopt a different paradigm of solving this technical problem (1). First, the search space is represented by a stochastic super net. The super net has the same macro-architecture as described in Table 1, and each layer contains 9 parallel blocks as described in Table 2. During the inference of the super net, at each layer a subset (e.g., only one) candidate block of the layer is sampled and executed with the sampling probability of:

$$P_{\theta_l}(b_l = b_{l,i}) = \text{softmax}(\theta_{l,i}; \theta_l) = \frac{\exp(\theta_{l,i})}{\sum_i \exp(\theta_{l,i})}. \quad (4)$$

$\theta_l$ contains parameters that determine the sampling probability of each block at layer-l. Equivalently, the output of layer-l can be expressed as:

$$x_{l+1} = \sum_i m_{l,i} \cdot b_{l,i}(x_l), \quad (5)$$

where mu is a random variable in {0,1} and is evaluated to 1 if block $b_{l,i}$ is sampled. The sampling probability is determined by equation (4). $b_{l,i}(x_l)$ denotes the output of block-i at layer l given the input feature map $x_l$. We let each layer sample independently, therefore, the probability of sampling an architecture a can be described as:

$$P_\theta(a) = \prod_l P_{\theta_l}(b_l = b_{l,i}^{(a)}), \quad (6)$$

where $\theta$ denotes the a vector consists of all the $\theta_{l,i}$ for each block-i at layer-l. $b_{l,i}^{(a)}$ denotes that in the sampled architecture a, block-i is chosen at layer-l.

Instead of solving for the optimal architecture $a \in \mathcal{A}$, which has a discrete search space, the problem may be relaxed to optimize the probability $P_\theta$ of stochastic super net 34 to achieve the minimum expected loss. Formally, the discrete optimization problem (1) is re-written as:

$$\min_\theta \min_{w_a} E_{a \sim P_\theta}\{\mathcal{L}(a, w_a)\}. \quad (7)$$

It is obvious the loss function in (7) is differentiable with respect to the architecture weights $w_a$ and therefore can be optimized by stochastic gradient descent (SGD). However, the loss is not directly differentiable to the sampling parameter $\theta$, since the gradient cannot pass through the discrete random variable $m_{l,i}$ to $\theta_{l,i}$. To sidestep this, the discrete mask variable $m_{l,i}$ is relaxed to be a continuous random variable computed by the Gumbel Softmax function:

$$m_{l,i} = \text{GumbelSoftmax}(\theta_{l,i} \mid \theta_l) \quad (8)$$
$$= \frac{\exp[(\theta_{l,i} + g_{l,i})/\mathcal{T}]}{\sum_i \exp[(\theta_{l,i} + g_{l,i})/\mathcal{T}]},$$

where $g_{l,i} \sim \text{Gumbel}(0, 1)$ is a random noise following the Gumbel distribution. The Gumbel Softmax function is controlled by a temperature parameter $\tau$. As $\tau$ approaches 0, it approximates the discrete categorical sampling following the distribution in (6). As $\tau$ becomes larger, $m_{l,i}$ becomes a continuous random variable. Regardless of the value of $\tau$, the mask $m_{l,i}$ is directly differentiable with respect to the parameter $\theta_{l,i}$.

As a result, the cross-entropy term from the loss function (2) is differentiable with respect to the mask $m_{l,i}$ and therefore $\theta_{l,i}$. For the latency term, since the lookup table based model is used for efficiency estimation, equation (3) can be written as:

$$LAT(a) = \sum_l \sum_i m_{l,i} \cdot LAT(b_{l,i}). \quad (9)$$

The latency of each operator $LAT(b_{l,i})$ is a constant coefficient, so the overall latency of architecture-a is differentiable with respect to the mask $m_{l,i}$, therefore $\theta_{l,i}$.

As a result, the loss function (2) is fully differentiable with respect to both weights $w_a$ and the architecture distribution parameter $\theta$. This allows use of SGD to efficiently solve problem (1).

Since the search space is constructed as multi-layered super net, the search process executed by DNAS search engine 32 on super net 34 has the added benefit of training stochastic super net 34. During the training, DNAS engine 32 computes $\partial \mathcal{L}/\partial \omega_a$ to train each operator's weight in super net 32 similar to training a convolutional neural network. Once the operators are trained, different operators can have a different contribution to the accuracy and the efficiency of the overall network. Therefore, DNAS engine 32 computes $\partial \mathcal{L}/\partial \theta$ to update the sampling probability $P_\theta$ for each operator. This process has the technical benefit of selecting operators having better accuracy and lower latency and suppressing the selection of the opposite ones. After DNAS engine 32 finishes training super net 34, DNAS engine 32 obtains the optimal architectures by sampling from the architecture distribution $P_\theta$.

As will be shown in the experimental results, the DNAS algorithm executed by DNAS engine 32 is orders of magnitude faster than previous RL-based NAS while producing better architectures.

To demonstrate the efficacy of the techniques implemented by DNAS engine 32, simulations were performed using the DNAS engine to search for ConvNet models on ImageNet 2012 classification dataset, as further described in J. Deng, W. Dong, R. Socher, L.-J. Li, K. Li, and L. Fei-Fei. Imagenet: A large-scale hierarchical image database, *IEEE Computer Vision and Pattern Recognition* 2009, pages 248-255, 2009. The discovered models are referred to herein as FBNets. One technical goal of the experiment was to discover convolutional neural network models with high accuracy and low latency on target devices. In a first experiment, Samsung Galaxy S8 with a Qualcomm Snapdragon 835 platform is targeted. The model is deployed with Caffe2 with int8 inference engine for mobile devices.

Before the search starts, a latency lookup table, as described herein, is built for the target device. Next, a stochastic super net is trained with the search space. The input resolution of the network is set to 224-by-224. To reduce the training time, 100 classes are randomly chosen from the original 1000 classes to train stochastic super net 34. Stochastic super net 34 is trained for 90 epochs. In each epoch, the operator weights $\omega_a$ are first trained, and then the architecture probability parameter $\theta$. $\omega_a$ is trained on 80% of ImageNet training set using SGD with momentum. The architecture distribution parameter $\theta$ is trained on the rest 20% of ImageNet training set. To control the temperature of the Gumbel Softmax from equation (8), an exponentially decaying temperature is used. After the search finishes, several architectures are sampled from the trained distribution $P_\theta$, and trained from scratch. The architecture search framework disclosed herein is implemented in Pytorch as described in K. Simonyan and A. Zisserman, *Very deep convolutional networks for large-scale image recognition*, arXiv:1409.1556, 2014. Searched models are trained in Caffe2.

The experiment results are summarized in Table 3, below. The searched models are compared with state-of-the-art efficient models both designed automatically and manually. In particular, the results from DNAS engine 32 are compared with various versions of the following models:

MobileNetV2 described in M. Sandler, A. Howard, M. Zhu, A. Zhmoginov, and L.-C. Chen, *Mobilenetv2: Inverted residuals and linear bottlenecks*, Proceedings of the IEEE Conference on Computer Vision and Pattern Recognition, pages 4510-4520, 2018, ShuffleNetV2 described in N. Ma, X. Zhang, H.-T. Zheng, and J. Sun, *Shufflenet v2: Practical guidelines for efficient cnn architecture design*, arXiv preprint arXiv: 1807.11164, 2018, CondenseNet described in G. Huang, S. Liu, L. van der Maaten, and K. Q. Weinberger, *Condensenet: An efficient densenet using learned group convolutions*, group, 3(12): 11, 2017

MnasNet described in M. Tan, B. Chen, R. Pang, V. Vasudevan, and Q. V. Le, *Mnasnet: Platform-aware neural architecture search for mobile*, arXiv preprint arXiv: 1807.11626, 2018, and DARTS described in H. Liu, K. Simonyan, and Y. Yang, *Darts: Differentiable architecture search*, arXiv preprint arXiv:1806.09055, 2018.

In some experiments, the primary metrics are top-1 accuracy on the ImageNet validation set and the latency. If the latency is not available, FLOP may be used as the secondary efficiency metric. Since, in these experiments, the network is deployed with caffe2 with highly efficient in8 implementation, there exists an unfair latency advantage against other baselines. Therefore, the baseline models are implemented and their latency is measured under the same environment for a fair comparison. For automatically designed models, the search method, search space, and search cost are also compared.

Table 3 divides the models into three categories according to their accuracy level. In the first group, FBNet-A achieves 73.0% accuracy, better than 1.0-MobileNetV2 (+1.0%), 1.5-ShuffleNet V2 (+0.4%), and CondenseNet (+2%), and are on par with DARTS and MnasNet-65. Regarding latency, FBNet-A is 1.9 ms (relative 9.6%), 2.2 ms (relative 11%), and 8.6 ms (relative 43%) better than the MobileNetV2, ShuffleNetV2, and CondenseNet counterparts. Although FLOP count was not optimized for directly, FBNet-A's FLOP count is only 249M, 50M smaller (relative 20%) than MobileNetV2 and ShuffleNetV2, 20M (relative 8%) smaller than MnasNet, and 2.4× smaller than DARTS. In the second group, FBNet-B achieves comparable accuracy with 1.3-MobileNetV2, but the latency is 1.46× lower, and the FLOP count is 1.73× smaller, even smaller than 1.0-MobileNetV2 and 1.5-ShuffleNet V2. Compared with MnasNet, FBNet-B's accuracy is 0.1% higher, latency is 0.6 ms lower, and FLOP count is 22M (relative 7%) smaller. The latency of NASNet-A and PNASNet is not available, but the accuracy is comparable, and the FLOP count is 1.9× and 2.0× smaller. In the third group, FBNet-C achieves 74.9% accuracy, same as 2.0-ShuffleNetV2 and better than all others. The latency is 28.1 ms, 1.33× and 1.19× faster than MobileNet and ShuffleNet. The FLOP count is 1.56×, 1.58×, and 1.03× smaller than MobileNet, ShuffleNet, and MnasNet-92. Among all the automatically searched models, FBNet's performance is much stronger than DARTS, PNAS, and NAS, and better than MnasNet. However, the search cost is orders of magnitude lower. MnasNet does not disclose the exact search cost (in terms of GPU-hours). However, it mentions that the controller samples 8,000 models during the search and each model is trained for five epochs. According to the experiments, training of MNas-Net for one epoch takes 17 minutes using 8 GPUs. So the estimated cost for training 8,000 models for 5 epochs is about $$\frac{17}{60} \times 5 \times 8 \times 8{,}000 \approx 91 \times 10^3$$

GPU hours. In comparison, the FBNet search takes 8 GPUs for only 27 hours, so the computational cost is only 216 GPU hours, or 421× faster than MnasNet, 222× faster than NAS, 27.8× faster than PNAS, and 1.33× faster than DARTS.

TABLE 3

IMAGENET CLASSIFICATION PERFORMANCE COMPARED WITH BASELINES

| Model | Search method | Search space | Search cost (GPU hours/relative) | # Params | # FLOPs | CPU Latency | Top-1 acc (%) |
|---|---|---|---|---|---|---|---|
| 1.0-MobileNet V2 [17] | manual | — | — | 3.4M | 300M | 21.7 ms | 72.0 |
| 1.5-ShuffleNetV2 [13] | manual | — | — | 3.5M | 299M | 22.0 ms | 72.6 |
| CondenseNet (G = C = 8) [7] | manual | — | — | 2.9M | 274M | 28.4 ‡ ms | 71.0 |
| MnasNet-65 [13] | RL | stage-wise | 91K*/421x | 3.6M | 270M | — | 73.0 |
| DARTS [12] | gradient | cell | 288/1.33x | 4.9M | 595M | — | 73.1 |
| FBNet-A (ours) | gradient | layer-wise | 216/1.0x | 4.3M | 249M | 19.8 ms | 73.0 |
| 1.3-MobileNet V2 [17] | manual | — | — | 5.3M | 509M | 33.8 mm | 74.4 |
| CondenseNet (G = C = 4) [7] | manual | — | — | 4.8M | 529M | 28.7‡ ms | 73.8 |
| MnasNet [20] | RL | stage-wise | 91K*/421x | 4.2M | 317M | 23.7 ms | 74.0 |
| NASNet-A [31] | RL | cell | 48K/222x | 5.3M | 564M | — | 74.0 |
| PNASNet [11] | SMBO | cell | 6K†/27.8x | 5.1M | 588M | — | 74.2 |
| FBNet-B (ours) | gradient | layer-wise | 216/1.0x | 4.5M | 295M | 23.1 ms | 74.1 |
| 1.4-MobileNetV2 [17] | manual | — | — | 6.9M | 585M | 37.4 ms | 74.7 |
| 2.0-ShuffleNetV2 [13] | manual | — | — | 7.4M | 591M | 33.3 ms | 74.9 |
| MnasNet-92 [20] | RL | stage-wise | 91K*/421x | 4.4M | 388M | — | 74.8 |
| FBNet-C (ours) | gradient | layer-wise | 216/1.0x | 5.5M | 375M | 28.1 ms | 74.9 |

Figure 5:
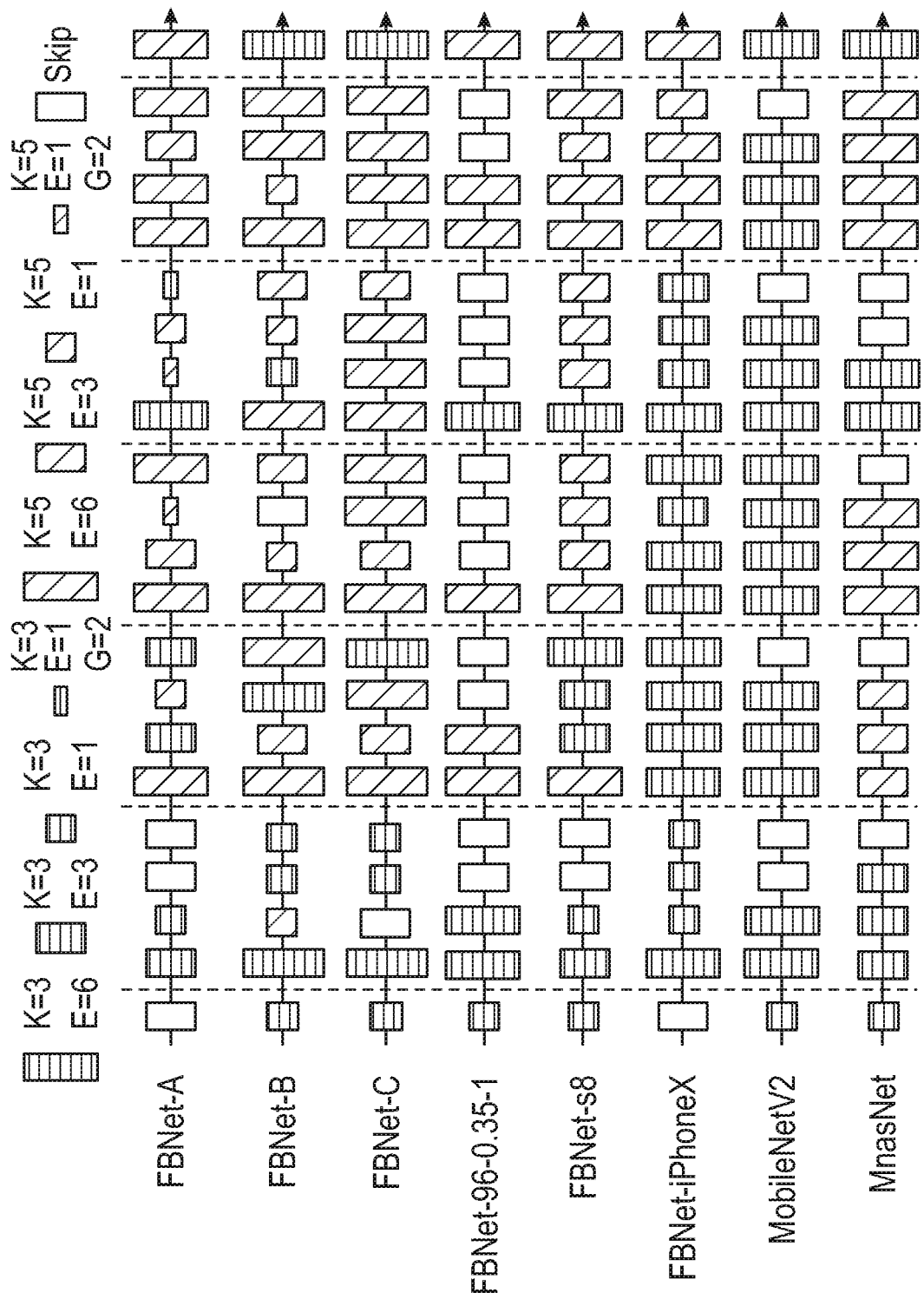
FIG. 5 is a graphical visualization illustrating example NN architectures searched according to the techniques described herein, where rectangle boxes indicate blocks for each layer and different shading denote kernel size of the depth-wise convolution.

FIG. 5 is a graphical visualization illustrating example NN architectures searched according to the techniques described herein, where rectangle boxes indicate number of blocks for each layer and different shading denote kernel size (K) of the depth-wise convolution. Different shading denotes the kernel size of the depthwise convolution, a first shading for kernel size of 3, a second shading for kernel size of 5, and empty for skipping. Height of each box to denotes the expansion rate of the block: 6, 3, 1, and 1 with group-2 convolution. In this example, FIG. 5 visualizes searched FBNets, MobileNetV2, and MnasNet.

One technique to reduce the computational cost of a ConvNet is to reduce the input resolution or channel size without changing the ConvNet structure. In some situations, this approach is likely to be sub-optimal. With a different input resolution and channel size scaling, the optimal ConvNet structure may be different. To test this, DNAS engine 32 is used to search for several different combinations of input resolution and channel size scaling. The result is summarized in Table 4 below in which MnasNet-scale is the MnasNet model with input and channel size scaling. MnasNet-search-192-0.5 is a model searched with an input size of 192 and channel scaling of 0.5. Compared with MobileNetV2 under the same input size and channel size scaling, the searched models achieve 1.5% to 6.4% better accuracy with similar latency. Especially the FBNet-96-0.35-1 model achieves 50.2% (+4.7%) accuracy and 2.9 ms latency (345 frames per second) on a Samsung Galaxy S8.

TABLE 4

FBNets searched for different input resolution and channel scaling

| Input size & Channel Scaling | Model | # Parameters | # FLOPs | CPU Latency | Top-1 acc (%) |
|---|---|---|---|---|---|
| (224, 0.35) | MobileNetV2-224-0.35 | 1.7M | 59M | 9.3 ms | 60.3 |
| | MNasNet-scale-224-0.35 | 1.9M | 76M | 10.7 ms | 62.4 (+2.1) |
| | FBNet-224-0.38 | 2.0M | 72M | 10.7 ms | 65.3 (+5.0) |
| (192, 0.50) | MobileNet.V2 | 2.0M | 71M | 8.4 ms | 63.9 |
| | MnasNet-search-192-0.5 | — | — | — | 65.6 (+1.7) |
| | FBNet-192-0.5 (ours) | 2.6M | 73M | 9.9 ms | 65.9 (+2.0) |
| (128, 1.0) | MobileNetV2 | 3.5M | 99M | 8.4 ms | 65.3 |
| | MnasNet-scale-128-1.0 | 4.2M | 103M | 9.2 ms | 67.3 (+2.0) |
| | FBNet-128-1.0 (ours) | 4.2M | 92M | 9.0 ms | 67.0 (+1.7) |
| (128, 0.50) | MobileNetV2 | 2.0M | 32M | 4.8 ms | 57.7 |
| | FBNet-128-0.5 (ours) | 2.4M | 32M | 5.1 ms | 60.0 (+2.3) |
| (96, 0.35) | MobileNetV2 | 1.7M | 11M | 3.8 ms | 45.5 |
| | FBNet-96-0.35-1 (ours) | 1.8M | 12.9M | 2.9 ms | 50.2 (+4.7) |
| | FBNet-96-0.35-2 (ours) | 1.9M | 13.7M | 3.6 ms | 51.9 (+6.4) |

The architecture of FBNet-96-0.35-1 is visualized in FIG. 5. As is shown, many layers are skipped, and the network is much shallower than FBNet-{A, B, C}, whose input size is 224. This may be because with smaller input size, the receptive field needed to parse the image also becomes smaller, so having more layers will not necessarily effectively increase the accuracy.

In previous ConvNet design practices, the same ConvNet model is deployed to many different devices. However, this is sub-optimal since different computing platforms and software implementation can have different characteristics. To validate this, search targeting is conducted for two mobile devices: Samsung Galaxy S8 with Qualcomm Snapdragon 835 platforms, and iPhone X with A11 Bionic processors. The same architecture search space is used, but with different latency lookup tables collected from two target devices. All the architecture search and training protocols are the same. After searching and training two models, the models are deployed to both Samsung Galaxy S8 and iPhone X to benchmark the overall latency. The result is summarized in Table. 5.

TABLE 5

FBNets searched for different devices

| Model | # Parameters | # FLOPs | Latency on iPhone X | Latency on Samsung S8 | Top-1 acc (%) |
|---|---|---|---|---|---|
| FBNet-iPhoneX | 4.47M | 322M | 19.84 ms (target) | 23.33 ms | 73.20 |
| FBNet-S8 | 4.43M | 293M | 27.53 ms | 22.12 ms (target) | 73.27 |

As can be seen, the two models reach similar accuracy (73:20% vs. 73:27%). FBNet-iphoneX model's latency is 19.84 ms on its target device, but when deployed to a Samsung S8, its latency increases to 23.33 ms. On the other hand, FBNet-S8 reaches a latency of 22.12 ms on a Samsung S8, but when deployed to an iPhone X, the latency hikes to 27.53 ms, 7.69 ms (relatively 39%) higher than FBNet-iPhone X. This demonstrates the necessity and effectiveness of the technical solutions described herein for re-designing ConvNets for different target devices.

Figure 6:
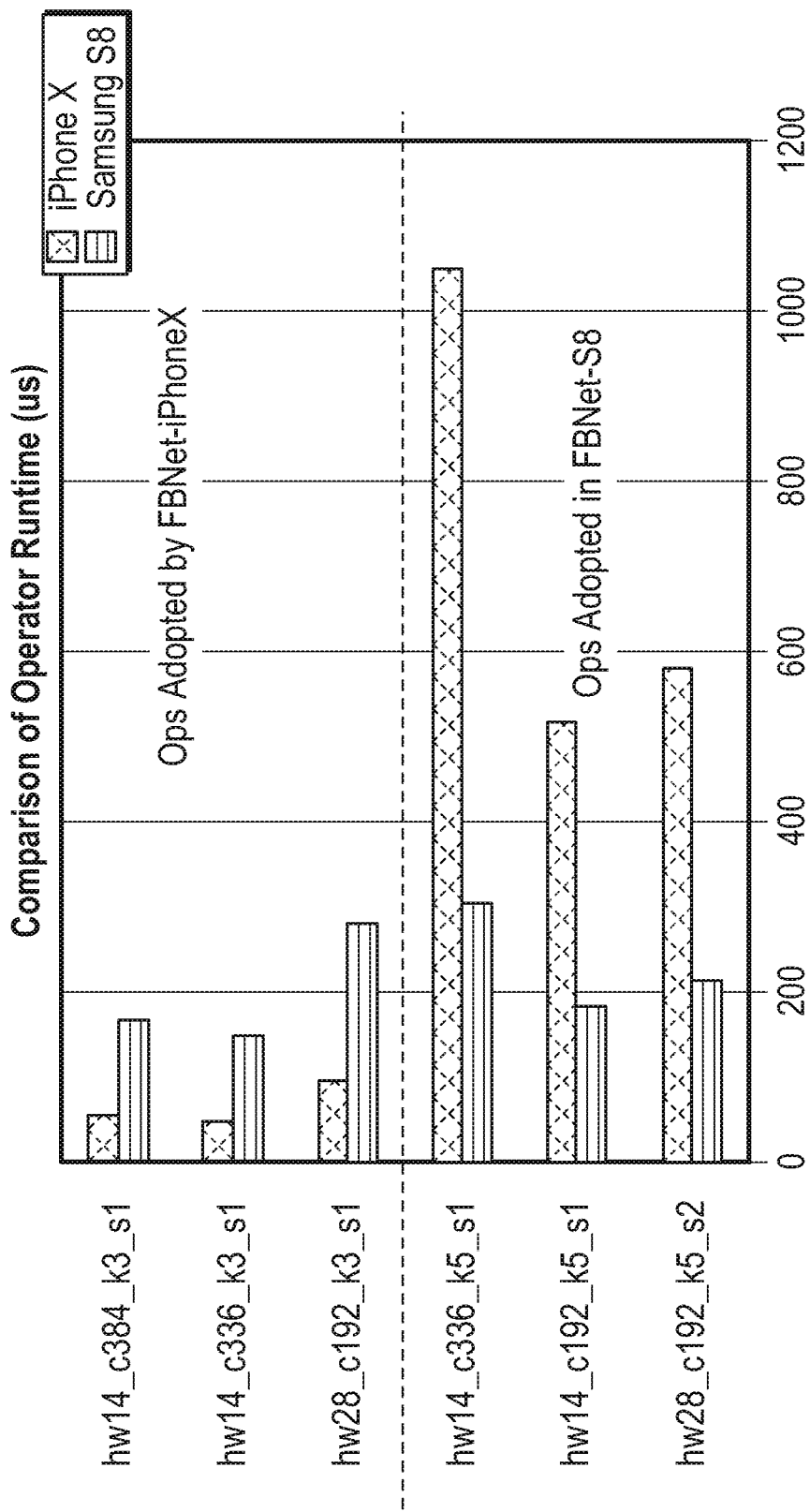
FIG. 6 is a graph providing graphical comparisons of operator runtime on two target devices.

FIG. 6 is a graphical comparison of operator runtime on two devices. Runtime is in micro-second (us). Runtime is in micro-second (us). A top bar for each operator denotes the runtime on iPhone X and bottom bar denotes the runtime on Samsung S8. The upper three operators are faster on iPhone X, therefore they are automatically adopted by the techniques described herein in the neural network generated by DNAS engine 32 for the iPhone X. The lower three operators are faster on Samsung S8, and they are also automatically adopted by DNAS engine 32 when generating and training the respective model.

Note that FBNet S8 uses many blocks with 5×5 depthwise convolution while FBNet-iPhoneX only uses them in the last two stages. The depthwise convolution operators used in the two models are examined and their runtime is compared on both devices. Notice the drastic runtime differences of the lower three operators on two target devices. It explains why the Samsung-S8-optimized model performs poorly on an iPhone X. This shows DNAS engine 32 can automatically optimize the operator adoptions and generate different ConvNets optimized for different devices.

This disclosure described various example implementations of a neural network generation system that implements a differentiable neural architecture search engine. As described, the DNAS engine optimizes over a layer-wise search space and represents the search space by a stochastic super net. In some examples, the actual target device latency of blocks is used to compute the loss for super net training. In experiments, FBNets, a family of models discovered by the DNAS techniques described herein, surpass state-of-the-art models, both manually and automatically designed: FBNet-B achieves 74.1% top-1 accuracy with 295M FLOPs and 23.1 ms latency, 2.4× smaller and 1.5× faster than MobileNetV2-1.3 with the same accuracy. It also achieves better accuracy and lower latency than MnasNet, the state-of-the-art efficient model designed automatically; we estimate the search cost of DNAS is 420× smaller. Such efficiency allows us to conduct searches for different input resolutions and channel scaling. Discovered models achieve 1.5% to 6.4% accuracy gains. The smallest FBNet achieves 50.2% accuracy with a latency of 2.9 ms (345 frames/sec) with batch size 1. Over the Samsung-optimized FBNet, the improved FBNet achieves 1.4× speed up on an iPhone X, showing DNAS is able to adapt to different target devices automatically.

The techniques of this disclosure may be implemented in a wide variety of devices or apparatuses, including a computing platform, such as a computing device or a distributed cloud-based computing system, having one or more processors, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware. In this way, the techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

Alternatively or additionally, if implemented in software or firmware, the techniques may be realized at least in part by a computer readable data storage medium comprising instructions that, when executed, cause one or more processors to perform one or more of the methods described above. For example, the computer-readable data storage medium or device may store such instructions for execution by a processor. Any combination of one or more computer-readable medium(s) may be utilized. A computer-readable storage medium (device) may form part of a computer program product, which may include packaging materials. A computer-readable storage medium (device) may comprise a computer data storage medium such as random access memory (RAM), read-only memory (ROM), non-volatile random access memory (NVRAM), electrically erasable programmable read-only memory (EEPROM), flash memory, magnetic or optical data storage media, and the like. In general, a computer-readable storage medium may be any tangible medium that can contain or store a program for use by or in connection with an instruction execution system, apparatus, or device. Additional examples of computer readable medium include computer-readable storage devices, computer-readable memory, and tangible computer-readable medium. In some examples, an article of manufacture may comprise one or more computer-readable storage media.

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other processing circuitry suitable for implementation of the techniques described herein. In addition, in some aspects, functionality described in this disclosure may be provided within software modules or hardware modules.

The invention claimed is:
1. A computer-implemented system comprising:
   a differentiable neural architecture search (DNAS) engine executing on one or more processors, wherein the DNAS engine is configured with a stochastic super net defining a layer-wise search space having a plurality of candidate layers, each of the candidate layers specifying one or more operators for a neural network architecture, wherein the DNAS engine is configured to train the stochastic super net by processing training data to train weights for the operators in the stochastic super net, wherein the DNAS engine is configured to train a weight for a respective operator based on a loss function representing a latency of the respective operator on a target platform, wherein the latency of the respective operator is based on an estimated runtime of the respective operator on the target platform that is independent of runtimes of other operators on the target platform, and wherein the DNAS engine is configured to select a set of candidate neural network architectures from the trained stochastic super net.

2. The system of claim 1, wherein the DNAS engine is configured to train the stochastic super net by traversing the layer-wise search space using gradient-based optimization of network architecture distribution.

3. The system of claim 1,
wherein the stochastic super net comprises each of the candidate layers having a plurality of parallel candidate blocks, and
wherein the DNAS engine is configured to train the stochastic super net by sampling each of the candidate layers to select and execute one of the candidate blocks from each of the candidate layers.

4. The system of claim 1,
wherein the layer-wise search space defines a set of input and output dimensions of image data for each of the candidate layers, and
wherein each of the candidate layers is associated with a corresponding image block type.

5. The system of claim 1, wherein one or more of the candidate layers is associated with a corresponding number of output filters.

6. The system of claim 1, wherein, to train the stochastic super net, the DNAS engine is configured to access a latency lookup table that defines the estimated runtime of the respective operator on the target platform.

7. A method comprising:
constructing a stochastic super net defining a layer-wise search space having a number of candidate layers, each of the candidate layers specifying one or more operators for a neural network architecture;
training the stochastic super net by processing training data to train weights for the operators in the stochastic super net, wherein training the stochastic super net includes training a weight for a respective operator based on a loss function associated with a latency of the respective operator on a target platform, wherein the latency of the respective operator is based on an estimated runtime of the respective operator on the target platform that is independent of runtimes of other operators on the target platform; and
selecting a set of candidate neural network architectures from the trained stochastic super net.

8. The method of claim 7, wherein training the stochastic super net comprises traversing the layer-wise search space using a gradient-based optimization of network architecture distribution.

9. The method of claim 7,
wherein constructing the stochastic super net comprises constructing each of the candidate layers to have a plurality of parallel candidate blocks, and
wherein training the stochastic super net comprises sampling each of the candidate layers to select and execute, with the training data, one of the candidate blocks from each of the candidate layers.

10. The method of claim 7,
wherein constructing the stochastic super net comprises constructing the layer-wise search space to define a set of input and output dimensions of image data for each of the candidate layers and associating each of the candidate layers with a corresponding image block type.

11. The method of claim 7, wherein training the stochastic super net comprises accessing a latency lookup table that defines the estimated runtime of the respective operator on the target platform.

12. A computer-readable medium comprising instructions for causing one or more programmable processors to:
construct a stochastic super net defining a layer-wise search space having a number of candidate layers, each of the candidate layers specifying one or more operators for a neural network architecture;
train the stochastic super net by processing training data to train weights for the operators in the stochastic super net, wherein the instructions cause the one or more programmable processors to train a weight for a respective operator based on a loss function associated with a latency of the respective operator on a target platform, wherein the latency of the respective operator is based on an estimated runtime of the respective operator on the target platform that is independent of runtimes of other operators on the target platform; and
select a set of candidate neural network architectures from the trained stochastic super net.

13. The computer-readable medium of claim 12, further comprising instructions to train the stochastic super net by traversing the layer-wise search space using a gradient-based optimization of network architecture distribution.

14. The computer-readable medium of claim 12, further comprising instructions to:
construct the stochastic super net by constructing each of the candidate layers to have a plurality of parallel candidate blocks, and
train the stochastic super net by sampling each of the candidate layers to select and execute, with the training data, one of the candidate blocks from each of the candidate layers.

15. The computer-readable medium of claim 12, further comprising instructions to
construct the stochastic super net by constructing the layer-wise search space to define a set of input and output dimensions of image data for each of the candidate layers and associating each of the candidate layers with a corresponding image block type.

16. The computer-readable medium of claim 12, further comprising instructions to train the stochastic super net by accessing a latency lookup table that defines the estimated runtime of the respective operator on the target platform, and computing an overall latency of one or more candidate convolutional neural network models according to estimated runtimes for the operators in the stochastic super net.

* * * * *